United States Patent [19]

Debenedetti

[11] 3,801,406

[45] Apr. 2, 1974

[54] METHOD OF FORMING GASKETS

[75] Inventor: Guglielmo Debenedetti, Turin, Italy

[73] Assignee: Insit S.p.A., Turin, Italy

[22] Filed: Nov. 3, 1971

[21] Appl. No.: 195,359

[30] Foreign Application Priority Data
Nov. 11, 1970 Italy.................................. 70752/70

[52] U.S. Cl................. 156/306, 156/250, 156/324, 264/37, 264/145, 264/148, 264/153, 264/157, 264/236
[51] Int. Cl...... B28b 11/14, B28b 11/16, C09j 5/00
[58] Field of Search........... 264/145, 153, 161, 162, 264/171, 175, 236, 347, 37, DIG. 43, 148, 151, 155, 156, 158, 160; 425/DIG. 42, 307, 308; 156/85, 250, 267, 306, 324

[56] References Cited
UNITED STATES PATENTS
3,093,443  6/1963  Levinson........................ 264/145 X
2,943,354  7/1960  Gora............................. 425/DIG. 42
2,382,177  8/1945  Schanz............................ 264/171 X
2,032,508  3/1936  Seiberling........................... 264/236

Primary Examiner—Robert F. White
Assistant Examiner—Thomas P. Pavelko
Attorney, Agent, or Firm—Sughrue, Rothwell, Mion, Zinn & Macpeak

[57] ABSTRACT

A method for making gaskets by producing a continuous strip of sheet stock either by calendaring or extruding a mixture of basic raw materials. At least one additional layer of material can be bonded to the continuous strip to produce a laminated strip. The continuous or laminated strip is then punched to form blanks having dimensions slightly greater than the dimensions of the desired gasket and vulcanizing the blanks under pressure. Gaskets are then formed from the vulcanized blanks.

7 Claims, 11 Drawing Figures

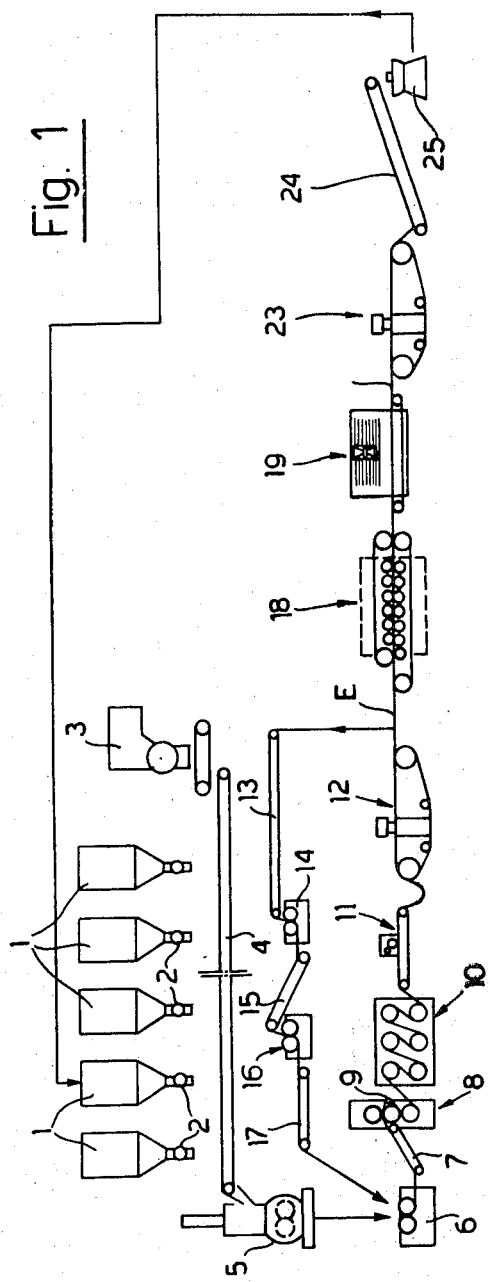
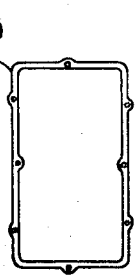
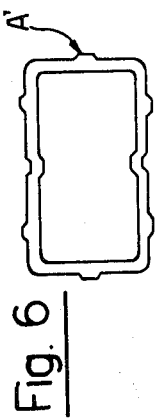
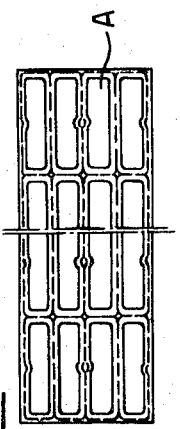

METHOD OF FORMING GASKETS

BACKGROUND OF THE INVENTION

The present invention relates to the manufacture of gaskets for industrial use, and particularly gaskets made from or incorporating cork or other load bearing elements (asbestos, cellulose, or such), or synthetic or natural polymers and/or copolymers, particularly vulcanisable elastomers.

In one known method of manufacturing such gaskets these are made by forming a vulcanised block of the material to the desired shape by pressing and subsequently slicing the block to form the individual gaskets, thereby forming gaskets the dimensions of which are finished without the need for any further stamping or punching operations, This method has, however, the following disadvantages:

a. there is a considerable lack of uniformity in the vulcanising of the gasket, due to variations in heating of different portions of the die in which the block is pressed;

b. some gaskets made by this method have considerable dimensional irregularity owing to the inevitable and variable shrinkage of at least one component of the material (cork) which has characteristics which cannot be time standardised since they are of organic origin;

c. a large amount of manual labour is necessary because of the need to have detachable dies so as to be able to extract the block of material after pressing and before slicing; the block tends to adhere to the sides of the die so that in every operation the die has to be dismantled and reassembled;

d. the material has to spend a considerable time in the press;

e. the first and the last gasket cut from each block is wasted.

In another known method, gaskets of the above mentioned type can be formed by punching or stamping, from a slab or sheet of composite material in the raw state, a block having, in cross section, an outer and an inner outline shape which includes the shapes of the gasket or gaskets which are to be made, vulcanising this block without a die, subsequently slicing through the vulcanised block and finally punching or stamping the desired final shape from the sliced portions thus forming the finished gaskets.

In this method the vulcanising die is eliminated so that a greater dimensional uniformity of the finished product can be achieved. Moreover, the shaped block is obtained by means of a punching or stamping operation which is a faster process than if the material had to remain in a press.

Against these advantages there are various disadvantages such as lack of uniformity in vulcanisation as in the previous case, a relatively high operating cost due to a necessity for calendering the slab or sheet which has to be done by hand upon a roller mixer, and again the first and last gaskets are wasted upon slicing.

In order to reduce the number of operations involved in the manufacture, another known method could be employed; this consists of cutting the gaskets directly from a slab or sheet of composite material in the crude or raw state, the gaskets being cut to their final thickness and dimensions, vulcanising the gaskets under pressure and cooling them while they are still pressed between the vulcanising plates in order to prevent them from shrinking or distorting during vulcanising. This method, difficult enough to achieve in the laboratory, has proved to be virtually impossible in the factory, because in practice the gaskets do not retain their shape or dimensions even if held tightly in the vulcanising plates, particularly if the gaskets are made at least partly of cork.

Moreover, in this method, it is extremely difficult to handle the non-vulcanised workpieces in large quantities, and to locate them with any degree of precision in the vulcanising plates due to the fact that they are very soft and fragile; this make the time taken in performing this method prohibitive. Also, since it is necessary to cool the pieces between the vulcanising plates this method is very time consuming and consequently involves high costs particularly if presses are used; alternatively, they could be stacked in furnaces, but this leads to a lack of consistency in the thickness and other physical properties of the finished gaskets.

OBJECTS OF THE INVENTION

One object of the present invention is to avoid the above mentioned disadvantages of the known methods of manufacturing gaskets, and to provide a method for the manufacture of gaskets of the type mentioned above which can be operated in a continuous cycle mainly by mechanised devices, and which produces gaskets having improved dimensional uniformity.

Another object of the present invention is to provide a method of the above mentioned type which is simple and easy to perform, and which can be performed in less time than previously known methods thus reducing the production costs of the goods manufactured.

A further object of the invention is to provide a method in which the material scraps cut off during manufacture can be re-used in a continuous cycle.

SUMMARY OF THE INVENTION

According, therefore, to one aspect of the present invention there is provided a method of manufacturing gaskets for industrial use from a mixture of elements such as cork and vulcanisable elastomers, comprising the steps of producing a continuous strip of composite material from the basic raw materials and from which the gaskets are to be formed, the strip being of a thickness slightly greater than that of the finished gaskets, punching the continuous strip to form blanks having dimensions such that at least one gasket can be cut therefrom, vulcanising the blanks under pressure, and trimming the vulcanised blanks to form the finished gaskets.

According to another aspect of the present invention there is provided apparatus for the manufacture of gaskets for industrial use from a mixture of materials such as cork and vulcanisable elastomers, by a method as herein described and claimed, comprising means for the continuous production of a strip of composite material of a greater thickness than the desired thickness of the finished gaskets, means for punching from the said continuous strip a plurality of blanks having dimensions such that at least one gasket can be cut therefrom, means for vulcanising under pressure the blanks punched from the said continuous strip, and means for trimming the vulcanised blanks to the desired size to form the finished gaskets.

Further features and advantages of the invention will become more apparent from the following description of the invention in which reference is made to the accompanying drawings, and which is provided solely by way of non-limiting examples.

BRIEF DESCRIPTION OF THE DRAWINGS

FIG. 1 is a diagrammatic general view of one embodiment of apparatus for performing the method of the present invention, for the manufacture of gaskets for industrial use;

FIG. 5 is a plan view of one type of blank which includes a number of gaskets;

FIG. 6 is a diagrammatic plan view of a blank containing only one gasket;

FIg. 9 is a plan view of a finished gasket of relatively large dimensions;

DESCRIPTION OF THE PREFERRED EMBODIMENTS

Figure 2:
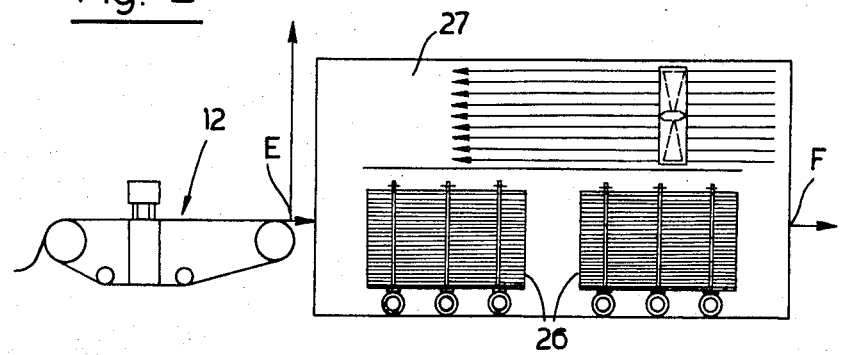
FIG. 2, 3 and 4 are diagrammatic partial views, illustrating three different embodiments of vulcanising apparatus for blanks, and all suitable for use in the embodiment of FIG. 1.

With reference now to FIG. 1 there are shown a number of containers 1, preferably silos, in which there are stored various raw materials which are to be used to make up the composite material; these silos are provided at their bases with outlets 2.

Should the composite material include a raw material which is delivered to be stored in blocks or ingots, such as, for example, rubber, then next to the containers 1 there is a balance 3 arranged to dispense measured quantities of such materials for incorporation into the composition.

The measure dispensers or silos 2, and the balance or scales 3 unload the materials for the mixture on to a conveyor belt 4 which feeds them to a first closed mixing device 5 from which the product moves to a roller mixer 6. The materials are bonded together in the mixer 6 and leave the mixer 6 in the form of a web of material, which is then carried by a strip conveyor 7 to a calender 8, which converts the web into a continuous strip of substantially uniform thickness, slightly greater than the desired thickness of the finished gaskets. The thickness of the strip is of the order of 5 percent to 10 percent greater than that of the finished gaskets.

Figure 10:
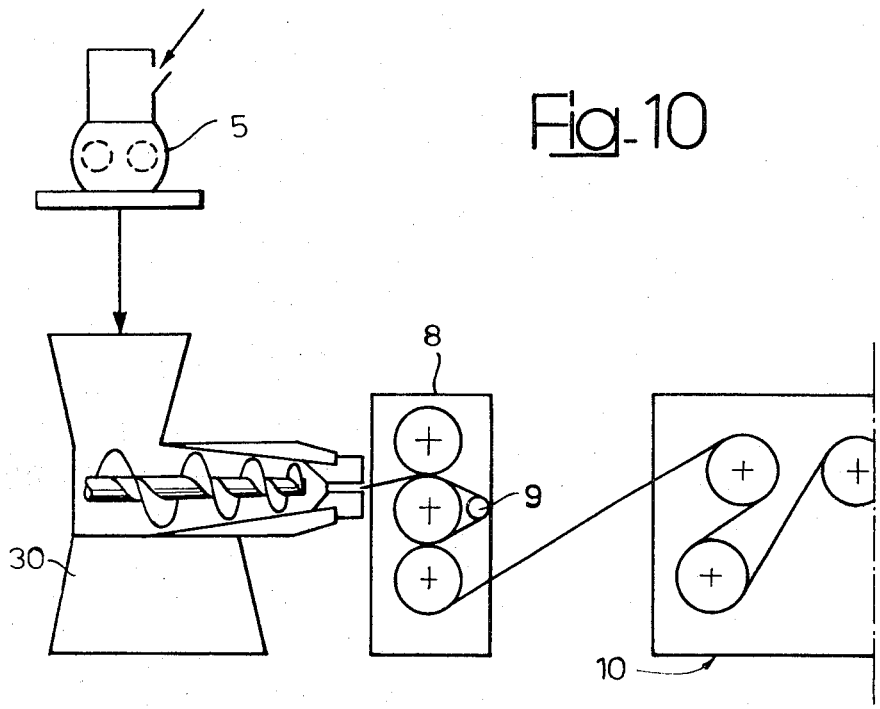
FIG. 10 is a side view of part of an embodiment in which an extruder is employed.
Figure 11:
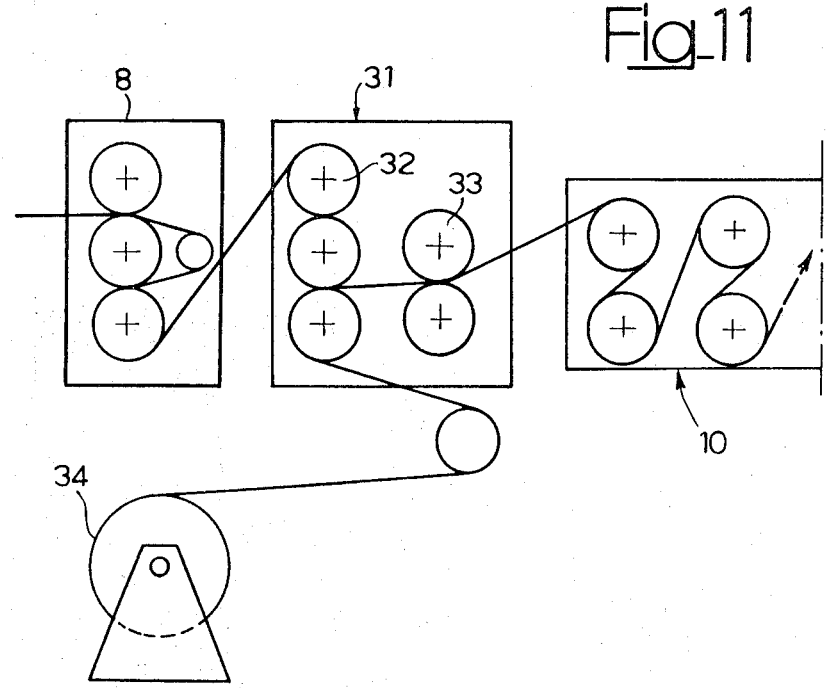
FIG. 11 is a side view of part of an embodiment in which the further process of bonding the continuous strip to an additional layer of different material is employed.

The calender 8 is provided with two sets of calender rolls, between the two pairs of calender rolls there is a roller 9, arranged to exert a tension on the continuous strip during the calendering, in order to make it flow smoothly from the first to the second pair of calender rolls. The roller mixer 6 could be replaced by an extruder as shown in FIG. 10, this produces a continuous sheet which could be passed subsequently to the calender 8; however, in the embodiment of FIG. 10 an extruder 30 provided with calender rolls at the outlet thereof is used so that the separate calender 8 can be dispensed with since a strip of uniform thickness is produced from the apparatus automatically. At this stage the strip can, if required, be bonded to at least one additional layer of material, for strengthening, protection, and/or adhesive purposes, and this can be applied to at least one surface of the strip, or can be sandwiched between two layers of the strip to form a laminated strip. FIG. 11 illustrates part of a suitable apparatus in which an additional layer is unwound from a coil 34 and bonded to the continuous strip by a series of rollers 31 comprising two sets or rollers 32 and 33, at least one set of which can be heated.

From the calender 8 the strip is conveyed to a roller cooling arrangement 10, at the outlet of which there is a bench 11 for checking and stamping the strip. After this the strip is passed to a punching device 12 which produces blanks A, A', examples of which are shown in FIGS. 5 and 6. The blanks have a thickness slightly greater than that which the finished gasket is to have and is of dimensions slightly greater than the dimensions of the gasket or gaskets which are to be formed therefrom.

Figure 7:
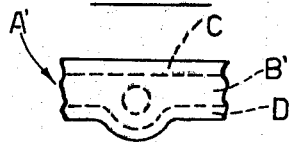
FIG. 7 is a partial diagrammatic plan view of a portion of a blank showing the relative dimensions of the blank and the finished gasket to be cut therefrom.

In FIG. 7 there is shown, on a larger scale, a portion of a blank in which the broken line indicates the portion D', which will form the finished gasket and in which the additional sections which are to be removed in a later stage of the procedure are marked C and D. These additional sections are necessary in order to compensate for possible distortion or shrinkage of the material of the strip during the next stages of manufacture.

The dimensions of the blanks are greater than those of the finished gasket by between about 3 and 8 mm, the precise dimension being decided on by experiment in relation to normal shrinkage and distortion. This will vary depending on the mixture used to form the composite strip, and on the shape of the final gasket. The additional dimensions are greater in the direction of calendering since it is in this direction that the greatest shrinkage occurs. There is, on average a 50 percent increase in the volume of the blank over that of the finished gasket.

Figure 8:
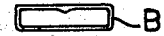
FIG. 8 is a plan view of a finished gasket of relatively small dimensions.

By suitable punching of the continuous strip leaving the cooling rollers 10 it is possible to make blanks of type A (FIG. 5) from which a considerable number of finished gaskets B (see FIG. 8) can be punched; alternatively, blanks of type A' (FIG. 6) from which only a few gaskets or, at the limit, only a single gasket B' (FIG. 9) is to be punched can be formed.

The off cuts of material from the strip are recovered by means of a belt 13 which conveys them to a mixer 14 from which they are transported by another belt 15 to a second mixer 16, and finally a belt 17 carries them to the main mixer 6 where they are added to the partly mixed materials arriving from the mixer 5. If the strip of composite material is produced by means of an extruder device with heated lead screws, the material scraps are carried directly into the inlet of the extruder by a single conveyor 13.

After the first stamping or punching operation the blanks (A, A') pass on to a vulcanisation stage, which can be effected by one of various different systems, shown separately in FIGS. 1 to 4. As shown in FIG. 1, the blanks A or A' are taken up by a device 18 having belts of heated steel which are firmly pressed together by a series of rollers. The heated steel belts carry out continuous vulcanisation of the blanks A, A' which then pass into a hot air tunnel 19 for a post-vulcanisation treatment. Next the vulcanised blanks pass to a cutting device 23 consisting preferably of a punching machine, from which the finished gaskets are obtained. The apparatus described above can be used with advantage for vulcanising blanks of the type shown in FIG. 5, which are of dimensions in the region of the maximum capacity of the puncher 23.

On emerging from the puncher 23 the scraps of vulcanised off cut material are taken up by a belt 24 and carried to a milling machine 23 where they are comminuted and from which they pass to one of the initial silos 1.

Figure 3:
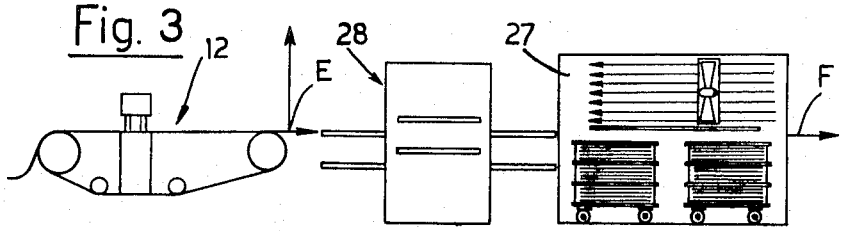
Figure 4:
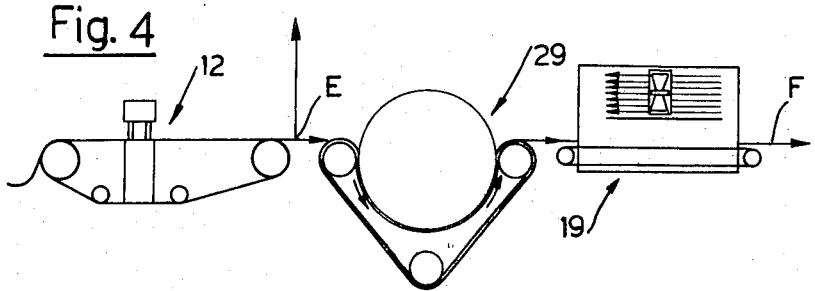

In FIGS. 2, 3 and 4 there are shown various different embodiments of vulcanising devices and which are suitable for replacing the components between the points E and F of the production line illustrated in FIG. 1. In FIG. 2 there is shown a vulcanising device in which the blanks are gathered together in stacks and placed upon trucks 26 which carry the stacks into a hot air tunnel 27 to be subjected to a slow vulcanising process at a relatively low temperature, after which they are transported to the puncher as previously described.

In the vulcanising apparatus shown in FIG. 3, the blanks are put into vulcanising presses 28 operating at a high temperature, they are then piled up without being compressed and stacked onto trucks which carry them through a hot air tennel 27 where they are subjected to a post-vulcanisation treatment before being punched.

In the vulcanising apparatus shown in FIG. 4, vulcanisation is effected in a rotating machine 29 having a large steam heated roller against which the blanks are pressed by a continuous steel belt between the roller and which the blanks are guided. At the output of this device there is a post-vulcanisation tunnel 19 of the type shown in FIG. 1. This vulcanising apparatus, like that shown in FIG. 1, is particularly advantageous for treating relatively large blanks of the A type.

The apparatus described makes it possible to continuously manufacture gaskets by means of a series of operations which can be carried out mechanically or automatically, thereby reducing the manual labour required to a minimum. Moreover, scrap cut off the strip or the blanks can be recovered and re-used so that there is no wastage of material at all.

Even though the method described above requires a larger number of different operations than some of the known methods, these operations can be automated so as to achieve a considerable reduction in the labour required, and therefore substantial economy of operation. In addition, the vulcanisation can be well controlled and no gaskets are wasted in the final cutting operation as in some of the previously known methods.

Naturally, the principle of the invention remaining unchanged, the forms in which it is put into effect and the details of construction can be widely varied in relation to what has been described and illustrated without nevertheless departing from the scope of this invention.

What is claimed is:

1. A method of making gaskets for industrial use from a mixture of load bearing raw materials, said method comprising the steps of:

producing a continuous strip of composite material from said mixture of said raw materials, said strip having a thickness slightly greater than the desired thickness of said gaskets to be produced therefrom, punching said continuous strip to form blanks having dimensions slightly greater than the dimensions of at least one of said gaskets to be made therefrom, vulcanising said blanks under pressure, and forming gaskets to the required dimension from said vulcanised blanks.

2. The method of claim 1 wherein said continuous strip of said material is produced from said mixture of raw materials by calendering.

3. The method of claim 1 wherein said continuous strip of said material is produced from said mixture of raw materials by extrusion.

4. The method of claim 1 further comprising the step of bonding at least one layer of additional material to said continuous strip of said material produced from said mixture of raw materials.

5. The method of claim 1 wherein vulcanisation of said blanks is effected continuously during performance of said method.

6. The method of claim 1 wherein vulcanisation of said blanks is effected in batches.

7. The method of claim 1 wherein said blanks are formed of a size whereby a plurality of gaskets can be cut therefrom.

* * * * *